United States Patent
Perrin et al.

(10) Patent No.: US 12,460,877 B2
(45) Date of Patent: Nov. 4, 2025

(54) THERMAL REGULATION DEVICE FOR A MOTOR VEHICLE, ESPECIALLY FOR COOLING

(71) Applicant: VALEO SYSTEMES THERMIQUES, La Verriere (FR)

(72) Inventors: Thibaut Perrin, La Verriere (FR); Stephane Tondelli, La Verriere (FR); Jianqi Sun, Hubei (CN); Tian Lan, Hubei (CN)

(73) Assignee: Valeo Systemes Thermiques, La Verriere (FR)

( * ) Notice: Subject to any disclaimer, the term of this patent is extended or adjusted under 35 U.S.C. 154(b) by 195 days.

(21) Appl. No.: 18/248,260

(22) PCT Filed: Oct. 7, 2021

(86) PCT No.: PCT/EP2021/077759
§ 371 (c)(1),
(2) Date: Apr. 7, 2023

(87) PCT Pub. No.: WO2022/074144
PCT Pub. Date: Apr. 14, 2022

(65) Prior Publication Data
US 2023/0375288 A1    Nov. 23, 2023

(30) Foreign Application Priority Data

Oct. 7, 2020 (FR) .................................. 2010223

(51) Int. Cl.
*F28F 3/12* (2006.01)
*F28D 21/00* (2006.01)
*F28F 9/02* (2006.01)

(52) U.S. Cl.
CPC ................ *F28F 3/12* (2013.01); *F28D 21/00* (2013.01); *F28F 9/0253* (2013.01);
(Continued)

(58) Field of Classification Search
CPC ........ F28F 3/12; F28F 9/0253; F28F 2210/10; F28F 2225/04; F28D 21/00; F28D 2021/0028
See application file for complete search history.

(56) References Cited

U.S. PATENT DOCUMENTS

| 4,982,785 A * | 1/1991 | Tomlinson ................ F28F 3/12 165/170 |
| 5,111,877 A | 5/1992 | Buchanan et al. |

(Continued)

FOREIGN PATENT DOCUMENTS

| DE | 102019118356 A1 | 1/2020 |
| DE | 102019130983 A1 | 5/2020 |

(Continued)

OTHER PUBLICATIONS

European Patent Office, International Search Report (with English translation) and Written Opinion of corresponding International Application No. PCT/EP2021/077759, dated Dec. 21, 2021.

*Primary Examiner* — Jon T. Schermerhorn, Jr.
(74) *Attorney, Agent, or Firm* — Valeo Systemes Thermiques

(57) ABSTRACT

A thermal regulation device, especially for cooling an electrical component likely to give off heat during operation, more especially for an electrical energy storage module, the device including an upper plate and a lower plate assembled with the upper plate so that, together, the plates form a plurality of channels for circulating a heat transfer fluid; the device being such that least some of the channels open into at least one bend chamber by virtue of which the fluid can pass round a bend; and such that at least one of the bend chamber and the channels includes a mechanical reinforcing member formed on a wall of the bend chamber or of one of the channels, the reinforcing member being configured so as (Continued)

to improve the mechanical strength of the chamber and/or the channel with regard to potential deformation under the effect of a high pressure.

13 Claims, 2 Drawing Sheets

(52) U.S. Cl.
CPC .. *F28D 2021/0028* (2013.01); *F28F 2210/10* (2013.01); *F28F 2225/04* (2013.01)

(56) References Cited

U.S. PATENT DOCUMENTS

| | | | | |
|---|---|---|---|---|
| 5,195,580 | A | * | 3/1993 | Hoeffken ............... B21D 39/02 |
| | | | | 29/890.039 |
| 5,346,001 | A | * | 9/1994 | Rieke ..................... F24H 3/105 |
| | | | | 165/170 |
| 5,751,414 | A | | 5/1998 | Nishishita |
| 6,938,688 | B2 | * | 9/2005 | Lengauer, Jr. .......... F28F 3/044 |
| | | | | 165/146 |
| 10,126,017 | B2 | * | 11/2018 | Noman .................... F28F 3/12 |
| 10,910,683 | B2 | | 2/2021 | Myers et al. |
| 2007/0074859 | A1 | | 4/2007 | Nakada |

FOREIGN PATENT DOCUMENTS

| | | | | |
|---|---|---|---|---|
| EP | 2828922 | B1 | 10/2017 | |
| FR | 3132594 | A1 * | 8/2023 | .......... H01M 10/613 |
| FR | 3135570 | A1 * | 11/2023 | ........ H01M 10/6568 |
| WO | 2005061981 | A1 | 7/2005 | |

* cited by examiner

THERMAL REGULATION DEVICE FOR A MOTOR VEHICLE, ESPECIALLY FOR COOLING

TECHNICAL FIELD

The present invention relates to a temperature regulation device, notably a cooling device, notably for an electrical component liable to give off heat during operation, notably to a device for cooling at least one battery or battery cells of a motor vehicle.

BACKGROUND OF THE INVENTION

Vehicle batteries, in particular for electric vehicles or hybrid vehicles, should as much as possible be maintained at the desired temperature, which is why so-called vehicle battery cooling devices are used. These cooling devices comprise cooling plates through which a cooling liquid circulates. The cooling plates are installed, as far as possible without gaps, on the outer side of the batteries in order to dissipate heat or else to heat the battery. Cooling devices in which the cooling plate is made up of two plate parts that are normally fixed directly to one another are known. In this case, the first plate part is preferably flat, and the second plate part is preferably a stamped or deformed metal sheet that has meandering depressions. Said depressions are closed by the flat plate part that is fixed to the stamped plate part, such that refrigerant ducts are formed. Patent EP 2 828 922 B1 describes such a device.

The invention aims to improve this type of device.

SUMMARY OF THE INVENTION

The invention thus proposes a thermal regulation device, notably a cooling device, for an electrical component liable to give off heat during operation, notably for an electrical energy storage module, this device having an upper plate and a lower plate joined to the top plate such that the plates together form a plurality of circulation channels for a heat transfer fluid, notably a refrigerant fluid, notably a fluid selected from the following refrigerant fluids R134a, R1234yf and R744, in which device at least some of the channels lead into at least one diverting chamber, by virtue of which the fluid can make a diversion, in which device at least one of the diverting chamber and the channels has a mechanical reinforcing element formed on a wall of this diverting chamber or of one of the channels, this reinforcing element being designed to improve the mechanical resistance of the chamber and/or of the channel to potential deformations under the action of high pressure.

In this type of device, there are concentrations of stresses in the zones in which the fluid must make diversions or reversals or take branching paths, for example nonlinear ones, notably in the zones in which the flow of fluid is distributed, collected or reversed. To avoid deformation in these zones, use is made of particular shapes, preferably obtained by stamping, these being the reinforcing elements according to the invention.

According to one aspect of the invention, the reinforcing element extends over the entire height of the diverting chamber and of the channels.

According to one aspect of the invention, the diverting chamber and the channels each have a length measured in a direction of flow of the fluid, and the reinforcing element extends only over part of the length of the diverting chamber and the channel, respectively, notably less than half of this length, or less than one quarter or one tenth of this length.

In other words, the reinforcing element is relatively small in relation to the diverting chamber or the channels as a whole.

According to one aspect of the invention, a plurality of reinforcing elements are provided along the diverting chamber and/or one of the channels, this plurality of reinforcing elements being, for example, evenly spaced apart from one another.

According to one aspect of the invention, these reinforcing elements formed on the diverting chamber are all identical.

According to one aspect of the invention, the reinforcing element has a rounded profile when viewed in a direction perpendicular to the plates, this rounded profile having a concavity directed towards the outside of the diverting chamber or of the associated channel.

According to one aspect of the invention, the concavity has a radius of curvature, notably with a value less than 5 mm, notably less than 2 mm.

According to one aspect of the invention, two neighboring channels are connected to the diverting chamber in connecting sections such that a gap between channels is present in the diverting chamber between the two connecting sections and the reinforcing element is located in this gap between channels, notably in the middle of this gap between channels.

According to one aspect of the invention, the reinforcing elements are disposed evenly spaced apart along a line running along the diverting chamber.

According to one aspect of the invention, the fluid passage cross section of the diverting chamber is increased on either side of each reinforcing element.

According to one aspect of the invention, two neighboring fluid channels are connected to the diverting chamber, and the reinforcing element formed on a lateral wall of the diverting chamber, facing these two fluid channels, is disposed so as to be able to position an inscribed imaginary circle adjacent to the two neighboring channels and the reinforcing element facing them, this inscribed circle having a diameter notably less than 15 mm.

According to one aspect of the invention, the reinforcing element(s) are formed by stamping.

The reinforcing element is preferably positioned in a joining zone where one channel joins another channel or a diverting chamber, this reinforcing element notably facing this channel.

Notably, when a number N of consecutive channels is connected to a diverting chamber, a number M of consecutive reinforcing elements is provided, with M=N or M being less than N.

According to one aspect of the invention, the reinforcing elements are disposed along a straight line, notably equidistantly from one another.

According to one aspect of the invention, the reinforcing elements make it possible to have larger fluid passage cross sections whilst still ensuring good mechanical resistance to deformation. This increase in the refrigerant fluid passage cross section is accompanied by a mechanical reinforcing element formed on a wall of this diverting chamber or of one of the channels, this reinforcing element being designed to improve the mechanical resistance of the chamber and/or of the channel to potential deformations under the action of high pressure. Decrease in the resulting pressure drop. The increase in passage cross section can be approximately +40% in relation to a conventional design without a reinforcing element.

The invention also makes it possible to improve the shape coefficient.

According to one aspect of the invention, the diverting chamber can be designed to make it possible to reverse the flow of fluid, or to make it possible to collect fluid at the fluid inlet or outlet. In the latter case, the diverting chamber can be referred to as fluid inlet or outlet collection chamber.

Another subject of the invention is a system having an electrical component liable to give off heat during operation, notably for an electrical energy storage module, and a cooling device described above that is designed to cool down the component, this component or battery being in thermal contact with the upper plate of the cooling device.

BRIEF DESCRIPTION OF DRAWINGS

Further features and advantages of the invention will become more clearly apparent from reading the following description, which is given by way of illustrative and non-limiting example, and the appended drawings, in which.

DETAILED DESCRIPTION OF THE INVENTION

Figure 1:
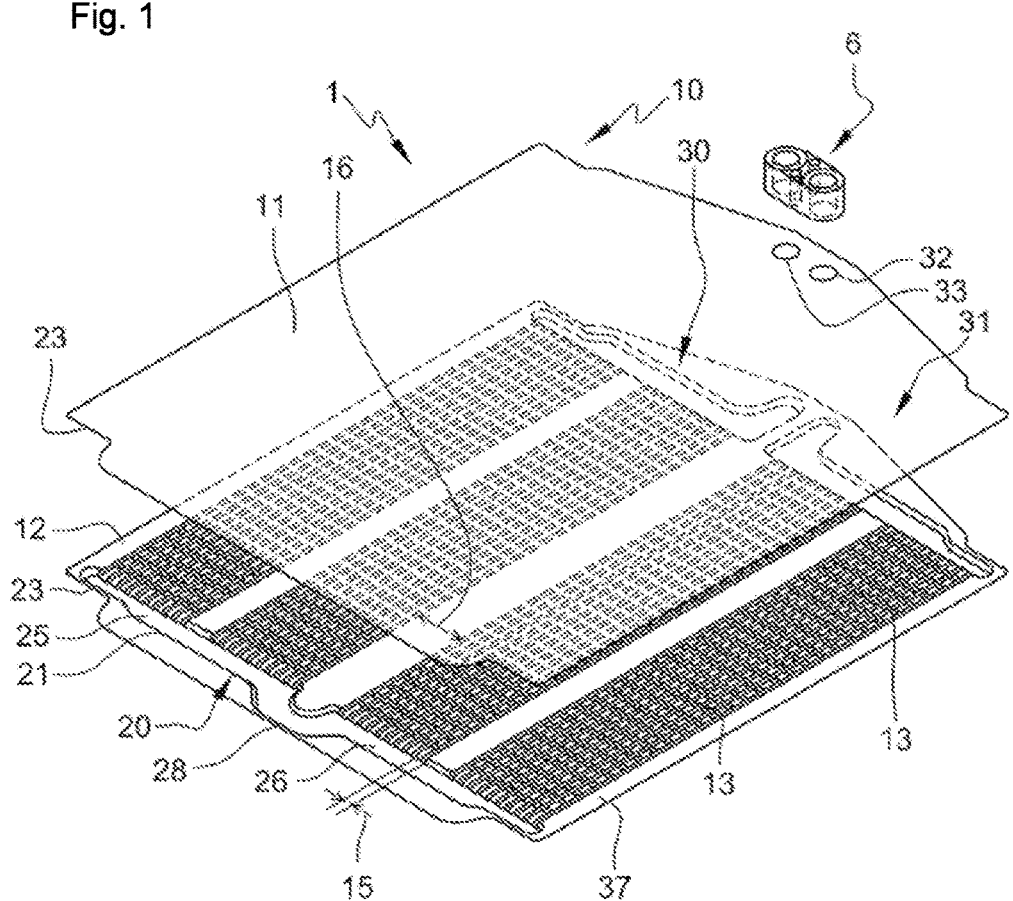
FIG. 1 schematically and partially illustrates a cooling device according to an example of the invention.
Figure 2:
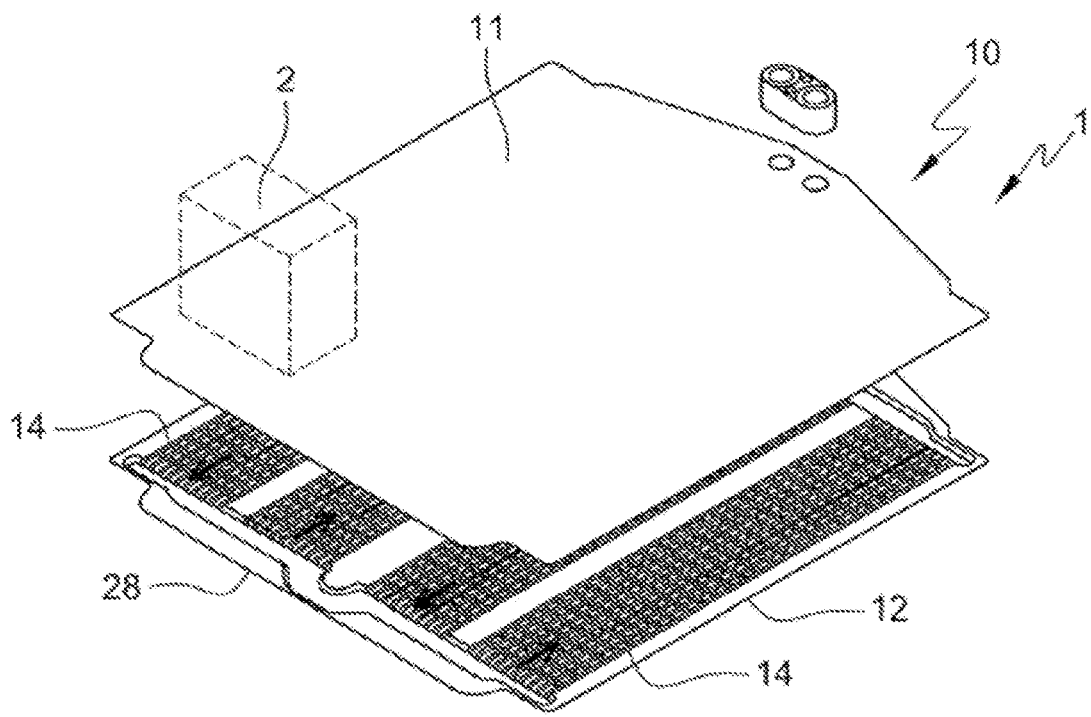
FIG. 2 schematically and partially illustrates the device of FIG. 1 in a different view.

FIGS. 1 and 2 depict a system 1 having a set of battery cells 2 to be cooled down, for example arranged in two or more rows, and a cooling device 10 designed to cool down the cells 2, which are in thermal contact with an upper plate of the cooling device 10, as explained below.

The temperature regulation device 10 has an upper plate 11, a lower plate 12 joined to the upper plate 11 such that the plates together form a plurality of circulation channels 13 for a heat transfer fluid, notably a refrigerant fluid, notably a fluid selected from the following refrigerant fluids: R134a, R1234yf and R744. The channels 13 are grouped into groups 14 of channels, the channels of a group extending substantially parallel to one another with a predetermined spacing between neighboring channels, referred to as intra-group spacing 15. The channels 13 each have a cross section of between 1 mm2 and 15 mm2, for example locally approximately 11 mm2 in each channel. The channels 13 extend substantially over the entire length of the plates.

The plates are made of aluminum.

The cooling device has a diverting chamber 20 designed to conduct the fluid leaving one of the groups 14 of channels toward one of the other groups of channels. The diverting chamber 20 is formed by the upper plate 11 and lower plate 12, for example made of aluminum. The lower plate 12 has a stamped zone 21 designed to contribute to the formation of the diverting chamber 20. The stamped zone 21 is closed with the other one of the plates 11, which is flat, so as to form the diverting chamber 20. The diverting chamber 20 extends over one side 23 of the plates.

The cooling device has an inlet zone 30 for refrigerant fluid entering the channels, this inlet zone being formed between the two plates 11 and 12. This fluid inlet zone 30 is designed to supply all the fluid circulation channels 13 which lead into the diverting chamber 20, specifically the channels in which the fluid flows toward the diverting chamber. This inlet zone 30 is common to the groups 14 of channels. The cooling device has an outlet zone 31 for refrigerant fluid leaving the channels, this outlet zone being formed between the two plates 11 and 12. This fluid outlet zone 31 is designed to conduct the fluid leaving all the fluid circulation channels 13 which originate from the diverting chamber. This outlet zone 31 is common to the two groups of channels. The inlet zone 30 and outlet zone 31 are adjacent to an inlet orifice 32 and outlet orifice 33, respectively. The inlet orifice 32 and outlet orifice 33 are linked to a pipe connector block 6.

The lower plate 2 has zones 37 of rounded cross section, notably stamped zones, to form the channels 13 with the upper plate. The inlet zone 30 and outlet zone 31 comprise stamped zones of the lower plate 12.

With preference, the heat transfer fluid can be chosen from the refrigerant fluids with the designation R134a, R1234yf and R744.

The battery cells comprise, for example, a plurality of lithium-ion (Li-ion) batteries for use in a hybrid vehicle. In another embodiment, the plurality of battery cells are Li-ion batteries for use in a battery-powered electric vehicle. The diverting chamber 20 and/or the inlet zone 30 and/or the outlet zone 31 include(s), where appropriate, reinforcing elements for reinforcing the mechanical strength in these zones, which are potentially of larger cross section.

Figure 3:
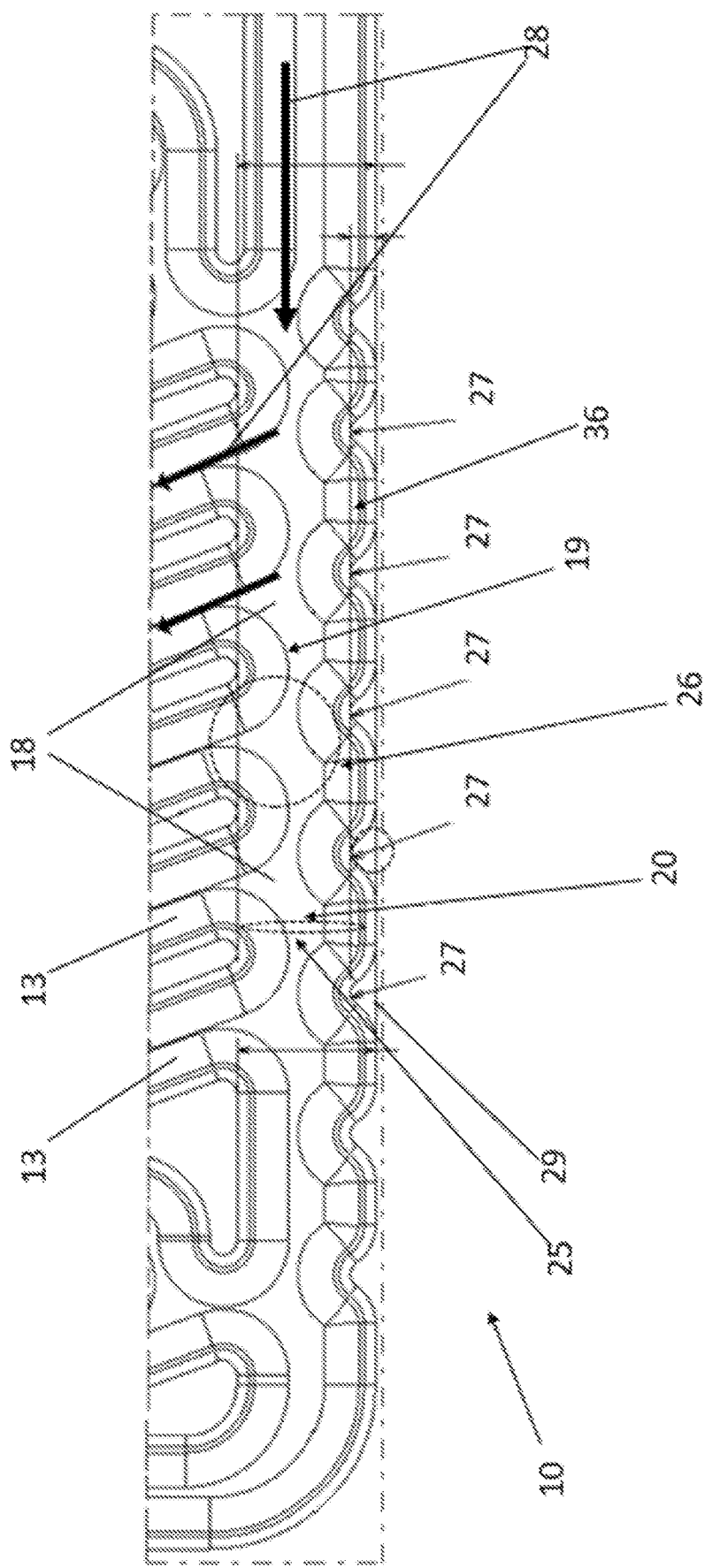
FIG. 3 schematically and partially illustrates a device according to another example of the invention, with details regarding part of the plates.

FIG. 3 depicts a detail of a device according to one exemplary embodiment of the invention, which shows most of the elements of the example described above.

Here, a further description will be given of a diverting chamber and of the channels connected thereto.

Channels 13 lead into a diverting chamber 20, by virtue of which the fluid can make a diversion.

The arrows 28 show the direction of flow of the fluid in the channels 13 and the diverting chamber 20.

The diverting chamber 20 has mechanical reinforcing elements 27 formed on a wall of this diverting chamber 20, each reinforcing element 27 being designed to improve the mechanical resistance of the chamber to potential deformations under the action of high pressure.

Each reinforcing element 27 extends over the entire height of the diverting chamber 20.

The diverting chamber 20 and the channels 13 each have a length measured in a direction of flow of the fluid, and each reinforcing element 27 extends only over part of the length of the diverting chamber 20, in this instance less than ⅕ or ⅛ or 1/10 of the total length of the associated diverting chamber 20.

The reinforcing elements 27 are provided along the diverting chamber 20, this plurality of reinforcing elements being evenly spaced apart from one another.

These reinforcing elements 27 formed on the diverting chamber 20 are all identical, with the same shape and the same dimensions.

Reinforcing elements with different shapes and/or dimensions could alternatively be provided.

Each reinforcing element 27 has a rounded profile when viewed in a direction perpendicular to the plates, this rounded profile having a concavity 29 directed towards the outside of the associated diverting chamber 20.

The concavity 29 has a radius of curvature, notably with a value less than 5 mm, notably less than 2 mm. The radius of curvature is that of the dotted-line circle in FIG. 3, with a value of 1.1 mm.

Two neighboring channels 13 are connected to the diverting chamber 20 in connecting sections 18 such that a gap 19 between channels is present in the diverting chamber 20 between the two connecting sections 18 and the reinforcing element 27 is located in this gap between channels, in this instance in the middle of this gap between channels.

The reinforcing elements 27 are disposed evenly spaced apart along a line 36 running along the diverting chamber 20.

The reinforcing elements 27 are formed by stamping on a corresponding plate.

The reinforcing elements 27 make it possible to have larger fluid passage cross sections whilst still ensuring good mechanical resistance to deformation. This increase in the refrigerant fluid passage cross section is accompanied by a decrease in the resulting pressure drop. The increase in passage cross section can be approximately +40% in relation to a conventional design without a reinforcing element.

Two neighboring fluid channels are connected to the diverting chamber, and the reinforcing element 27 formed on a lateral wall of the diverting chamber, facing these two fluid channels, is disposed so as to be able to position an inscribed imaginary circle 26 adjacent to the two neighboring channels and the reinforcing element facing them, this inscribed circle 26 having a diameter less than 15 mm.

It will be noted that the fluid passage cross section 25 of the diverting chamber 20 is increased on either side of each reinforcing element 27.

The diverting chamber 20 can be designed to make it possible to reverse the flow of fluid, or to make it possible to collect fluid at the fluid inlet or outlet. In the latter case, the diverting chamber can be referred to as fluid inlet or outlet collection chamber.

In a variant, one or more reinforcing elements 27 can be formed on at least one of the channels 13, notably on a nonlinear portion of this channel.

The invention claimed is:

1. A temperature regulation device for an electrical component liable to give off heat during operation, comprising an upper plate and a lower plate joined together and forming a plurality of circulation channels for a heat transfer fluid, wherein at least some of the circulation channels lead into at least one diverting chamber, by virtue of which the fluid can make a diversion, wherein at least one of the at least one diverting chamber and the plurality of circulation channels has a mechanical reinforcing element formed on a wall of the at least one diverting chamber or of one of the plurality of circulation channels, the mechanical reinforcing element being a stamped shape formed on a corresponding plate of the upper and lower plates so as to alter a fluid passage cross-section of the at least one of the at least one diverting chamber and the plurality of circulation channels.

2. The temperature regulation device as claimed in claim 1, wherein the mechanical reinforcing element extends over the entire height of the at least one diverting chamber and of the plurality of circulation channels.

3. The temperature regulation device as claimed in claim 1, wherein the at least one diverting chamber and the plurality of circulation channels each have a length measured in a direction of flow of the fluid, and the mechanical reinforcing element extends only over part of the length of the at least one diverting chamber and the plurality of circulation channels.

4. The temperature regulation device as claimed in claim 1, wherein a plurality of mechanical reinforcing elements are provided along the at least one diverting chamber and one of the plurality of circulation channels.

5. The temperature regulation device as claimed in claim 1, wherein the mechanical reinforcing element has a rounded profile when viewed in a direction perpendicular to the upper and lower plates, the rounded profile having a concavity directed towards the outside of the at least one diverting chamber or of an associated channel of the plurality of circulation channels.

6. The temperature regulation device as claimed in claim 5, wherein the concavity has a radius of curvature with a value less than 5 mm.

7. The temperature regulation device as claimed in claim 1, wherein two neighbouring circulation channels of the plurality of circulation channels are connected to the at least one diverting chamber in two connecting sections such that a gap between the two neighbouring circulation channels is present in the at least one diverting chamber between the two connecting sections and the mechanical reinforcing element is located in this gap between channels.

8. The temperature regulation device as claimed in claim 1, wherein a fluid passage cross section of the at least one diverting chamber is increased on either side of the mechanical reinforcing element.

9. The temperature regulation device as claimed in claim 1, wherein two neighbouring fluid channels are connected to the at least one diverting chamber, and the mechanical reinforcing element formed on a lateral wall of the at least one diverting chamber, facing these two fluid channels, is disposed so as to be able to position an inscribed imaginary circle adjacent to the two neighbouring channels and the mechanical reinforcing element facing them.

10. The temperature regulation device as claimed in claim 1, wherein the at least one diverting chamber is configured to reverse the flow of fluid.

11. A system comprising
an electrical component liable to give off heat during operation, and
a temperature regulation device, having an upper plate and a lower plate joined together and forming a plurality of circulation channels for a heat transfer fluid, wherein at least some of the circulation channels lead into at least one diverting chamber, by virtue of which the fluid can make a diversion, wherein at least one of the at least one diverting chamber and the plurality of circulation channels has a mechanical reinforcing element formed on a wall of the at least one diverting chamber or of one of the plurality of circulation channels, the mechanical reinforcing element being a stamped shape formed on a corresponding plate of the upper and lower plates so as to alter a fluid passage cross-section of the at least one of the at least one diverting chamber and the plurality of circulation channels,
the electrical component being in thermal contact with the upper plate of the temperature regulation device.

12. The temperature regulation device as claimed in claim 1, wherein a plurality of the mechanical reinforcing elements are provided along the at least one diverting chamber or one of the plurality of circulation channels.

13. The temperature regulation device as claimed in claim 1, further comprising a fluid inlet and fluid outlet, wherein the at least one diverting chamber is configured to collect fluid at the fluid inlet or outlet.

* * * * *